(12) United States Patent
Kriewall (10) Patent No.: US 8,375,126 B2
(45) Date of Patent: Feb. 12, 2013

(54) METHODS, APPARATUS AND TECHNIQUES FOR SUSPENDING, RESUMING, AND SHARING SESSIONS USING OBJECT SERIALIZATION

(75) Inventor: David Kriewall, Issaquah, WA (US)

(73) Assignee: Attachmate Corporation, Seattle, WA (US)

( * ) Notice: Subject to any disclaimer, the term of this patent is extended or adjusted under 35 U.S.C. 154(b) by 643 days.

(21) Appl. No.: 11/873,691

(22) Filed: Oct. 17, 2007

(65) Prior Publication Data

US 2009/0106422 A1    Apr. 23, 2009

(51) Int. Cl.
*G06F 15/173* (2006.01)

(52) U.S. Cl. ............ 709/225; 703/13; 703/20; 703/21; 703/23; 703/26

(58) Field of Classification Search .................. 709/225; 703/13, 20, 21, 23, 26
See application file for complete search history.

(56) References Cited

U.S. PATENT DOCUMENTS

| | | | | |
|---|---|---|---|---|
| 5,313,581 | A * | 5/1994 | Giokas et al. ................ | 719/329 |
| 5,796,396 | A * | 8/1998 | Rich ............................. | 715/741 |
| 6,023,558 | A * | 2/2000 | Grabowski .................... | 358/1.9 |
| 6,349,337 | B1 * | 2/2002 | Parsons et al. ............... | 709/227 |
| 6,417,849 | B2 * | 7/2002 | Lefebvre et al. ............. | 345/419 |
| 2006/0184535 | A1 * | 8/2006 | Kaluskar et al. ............. | 707/10 |

OTHER PUBLICATIONS

Fitzgerald, P., Rosson, N., Uljon, L. Evaluating Alternative Display Sharing System Architectures. IEEE [online], Apr. 1991 [retrieved on May 8, 2009]. Retrieved from the Internet:<URL: http://ieeexplore.ieee.org/stamp/stamp.jsp?tp=&arnumber=152884&isnumber=3991>.*

Bennett, F., Richardson, T., Harter, A. Teleporting—Making Applications Mobile. Olivetti Research Laboratory [online], 1994 [retrieved on Mar. 13, 2010]. Retrieved from the Internet:<URL: http://docs.google.com/viewer?a=v&q=cache:636lelvpFTkJ:citeseerx.ist.psu.edu/viewdoc/download%3Fdoi%3D10.1.1.30.4924%26rep%3Drep1%26type%3Dpdf+display+sharing+syst.*

* cited by examiner

*Primary Examiner* — Phuoc Nguyen
*Assistant Examiner* — Adam Cooney
(74) *Attorney, Agent, or Firm* — Schwegman, Lundberg & Woessner, P.A.

(57) ABSTRACT

An X display may be dynamically rerouted to a different graphics terminal, or to several graphics terminals, without disrupting X clients. The corresponding X server architecture includes a static, protocol router part which acts as an endpoint for client connections and which routes X protocol to one or more X server displays, and a dynamic X display part which maintains the state and contents of the display. An X display may maintain its state and display contents entirely in memory without any need for physical display or input devices, in which case it is termed a "headless X display" and provides a virtual X server display that appears to the host as if it were a user-interactive display. The architecture allows for any number of X displays to be attached to the protocol router for multi-user, fault tolerant or suspend/resume functionality.

8 Claims, 5 Drawing Sheets

Exemplary Distributed Configuration

Figure 1  Exemplary Fault Tolerance

Figure 2 Exemplary Session Sharing

Figure 3  Exemplary Suspend and Resume

Figure 4 – Exemplary Distributed Configuration

Figure 5 – Exemplary Standalone Configuration

METHODS, APPARATUS AND TECHNIQUES FOR SUSPENDING, RESUMING, AND SHARING SESSIONS USING OBJECT SERIALIZATION

CROSS-REFERENCES TO RELATED APPLICATIONS

N/A

STATEMENT REGARDING FEDERALLY SPONSORED RESEARCH OR DEVELOPMENT

N/A

TECHNICAL FIELD

The technology herein relates to platform-independent session migration. Still more particularly, the technology herein relates to an X server emulator whose session can be suspended and resumed. The technology herein further relates to a failsafe capability that allows an accidentally lost session to be resumed, and/or allows multiple X servers to see the same session.

BACKGROUND AND SUMMARY

X Windows applications were developed for UNIX software platforms decades ago but continue to be in wide use today for many important applications including industrial graphics design. Companies have a lot invested in X applications and wish to continue to use and support them despite changes in network topography, workstation hardware and server architectures. Software companies such as Attachmate provide so-called X servers such as Reflection X® that continue to support this important X server legacy functionality.

In more detail, the X Window System (commonly X11 or X) is a networking and display protocol which provides windowing on bitmap displays. X originated at MIT in 1984. The current protocol version, X11, appeared in September 1987. The X.Org Foundation leads the X project, with the current reference implementation, version 11 release 7.2 (Feb. 15, 2007), available as free software under the MIT License and similar permissive licenses, incorporated herein by reference. X provides the standard toolkit and protocol to build graphical user interfaces (GUIs) on Unix-like operating systems and OpenVMS, and is supported by almost ALL other modern operating systems. X also provides the basic framework, or primitives, for building GUI environments: drawing and moving windows on the screen and interacting with a mouse and/or keyboard. X does not mandate the user interface—instead, individual client programs handle this. X features network transparency: the machine where an application program (the client application) runs can differ from the user's local machine (the display server). See also Wikipedia article on "X Window System" on the Internet.

The traditional X server is a monolithic application, written in C and developed over a period of two decades. It implements a network-based graphical windowing environment for applications known as "X clients." An X server accepts incoming connections from X clients, processes X protocol produced by these clients, and displays output in accordance with this protocol. The display may consist of one or more screens, but all screens are generally connected to one machine. There is only one display per instance of the X server. This X server instance is referred to as an "X session." In modern times, such display functionality is typically provided on a user's LINUX, WINDOWS, UNIX or other platform through an emulation process that provides suitable mapping/translation between X protocol and physical personal computer displays and input devices.

The traditional X server's design imposes several limitations. For example, any hardware or network failure in the X server generally causes clients to disconnect and crash. A second limitation is that session sharing is not possible without additional software, commonly referred to as a server proxy or a "middle tier" component. Such a "middle tier" component can be used to intercept X client protocol and duplicate to all X servers or displays in the shared session.

Using one exemplary prior art approach, a middle-tier "headless" X display is maintained on a server machine at all times, and a viewer application is developed to display the contents of that X display on a remote machine. Oftentimes, different viewers have needed to be developed for different remote machines.

Another past approach to session sharing has been to capture all X protocol for the entire session; then create a new X server, and replay the captured protocol into the new X server, thereby bringing the new X server to a state identical to that of an existing X server. However, this replaying process takes time. As more and more client protocol is generated and stored, the burden of replaying that protocol becomes larger and larger.

While much work has been done in the past, further improvements are possible and desirable.

The exemplary illustrative non-limiting implementation permits the display to be dynamically rerouted to a different graphics terminal, or to several graphics terminals, without disrupting X clients. In more detail, the exemplary illustrative non-limiting implementation breaks the previously-monolithic X server into two parts:

a static part which acts as an endpoint for client connections and which routes X protocol to one or more X server displays (the "protocol router"); and a dynamic part which maintains the state and contents of the display (the "X display").

An X display may maintain its state and display contents entirely in memory without any need for physical display or input devices, in which case it is termed a "headless X display" and provides a virtual X server display that appears to the host as if it were a user-interactive display when in fact it comprises an entirely automated computer process that does not require user input or interaction in order to keep a session active or "alive." The architecture allows for any number of X displays to be attached to the protocol router.

The exemplary illustrative non-limiting implementation creates a new X display to be attached by serializing or "cloning" an existing X display to create the new one. This serialization technique involves taking a snapshot of the entire memory footprint of the X display, sending that snapshot to another machine and recreating a completely new X display which has state and contents identical to the original X display. Such platform-independent migration has many advantages in terms of fault tolerance, mobility, etc.

Exemplary illustrative non-limiting features and advantages of the exemplary illustrative non-limiting implementations disclosed herein include:

Does not require a middle tier or permanent headless X server.

Any X server can be used as a source for cloning a new X server.

Avoids doubling the computing burden necessary with a middle tier (where graphics are drawn to the headless X server, as well as on all viewers.)

Alleviates the need for development of a separate viewer application and concomitant protocol.

Instantaneous, as compared to the approach of replaying X protocol.

Permits a user to insure their session against local machine or connection failure at any time, by creating a headless X display from the user's X display and parking it on a "safe" machine (inside the company's firewall, for example).

All the advantages of a middle tier solution without requiring the middle tier; and none of the disadvantages of a protocol-replaying solution because the current state of an X server can be captured and reproduced at will.

Imposes no additional burden when running in the canonical "one protocol router, one X display" mode. Both pieces may run inside the same process, and effectively reproduce the original configuration of a single X server.

"Headless" X display created only when a session is suspended.

X server written in a language such as Java that supports object serialization (i.e., an object oriented language) provides platform-independence.

There are at least three contexts in which the exemplary illustrative non-limiting implementation would be useful:

1) To suspend a session (e.g. at work) and resume it elsewhere (e.g. at home)

2) To share a session with other users (e.g., a classroom lecture; or, a user who temporarily needs help from the help desk)

3) To provide a backup against failure of the network (e.g. while working remotely over a poor quality line) or failure of the user's local machine.

BRIEF DESCRIPTION OF THE DRAWINGS

These and other features and advantages will be better and more completely understood by referring to the following detailed description of exemplary non-limiting illustrative implementations in conjunction with the drawings of which.

DETAILED DESCRIPTION

Exemplary Non-Limiting Illustration of Fault Tolerance

Figure 1:
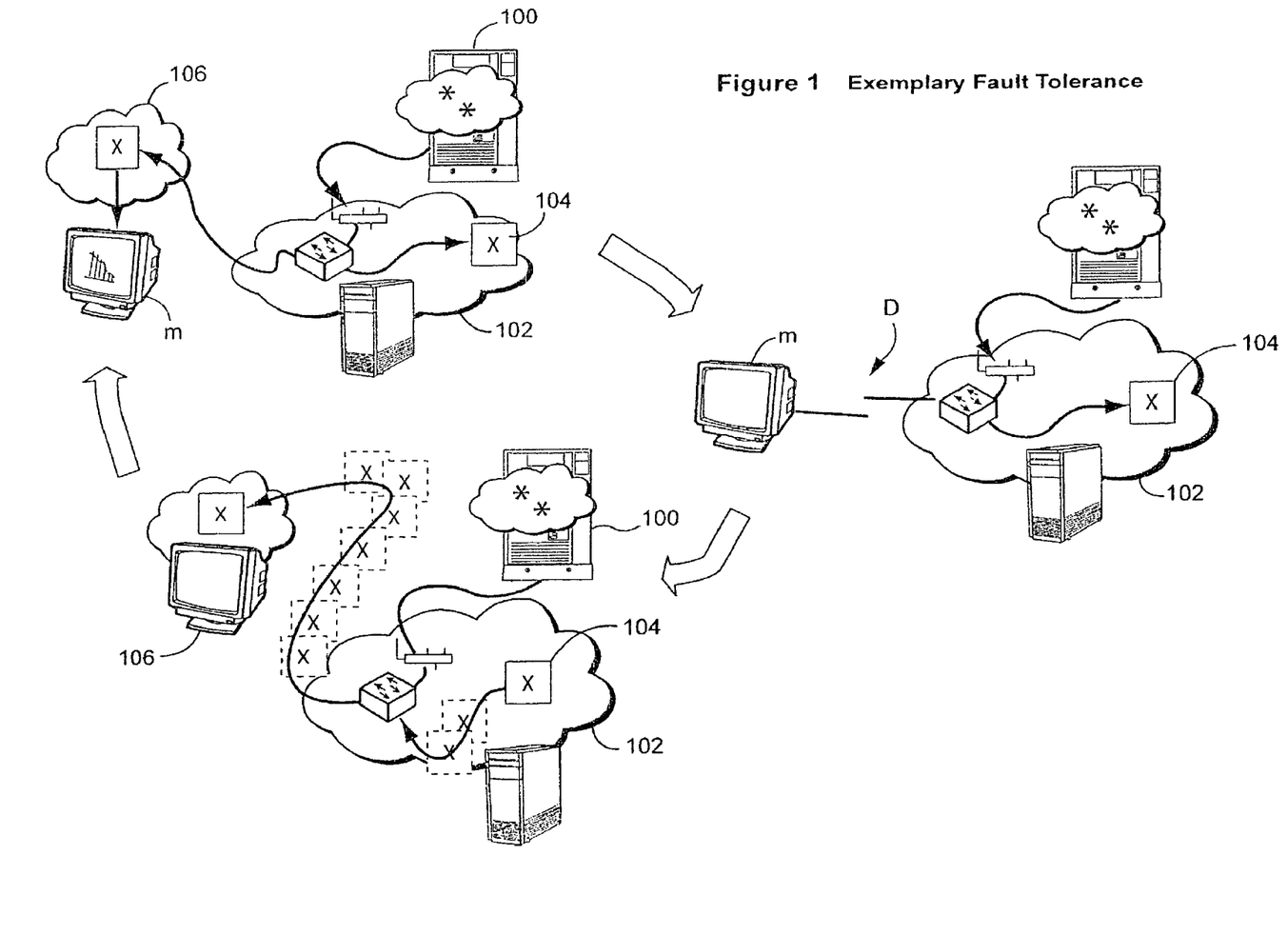
FIG. 1 is an exemplary non-limiting illustration of session migration/fault tolerance.

Referring to FIG. 1, the upper left diagram illustrates the normal operation of an X client application 100 connected to a protocol router 102, which in turn routes protocol to two X server displays: one is a "headless" X server display 104 (which maintains the display entirely in memory) and is collocated with the protocol router on the same machine in this example; the other is a normal X display 106 on the user's workstation (represented as a colored bar chart on a monitor M.)

The headless X server 104's existence permits session recovery in the event of a network or hardware failure. The upper right diagram illustrates a network disconnection D between the user's workstation 106 and the protocol router 102. However, the X client application continues to operate normally; its protocol is handled by the headless X server 104.

When the user is able to reestablish a network connection (bottom diagram), the protocol router 102 suspends communication with the X client 100, and creates a new X server display 106 on the user's workstation by cloning the headless X server display 104 and transmitting it to the user's workstation. Normal operation is then resumed (upper left diagram).

Exemplary Non-Limiting Illustration of Session Sharing

Figure 2:
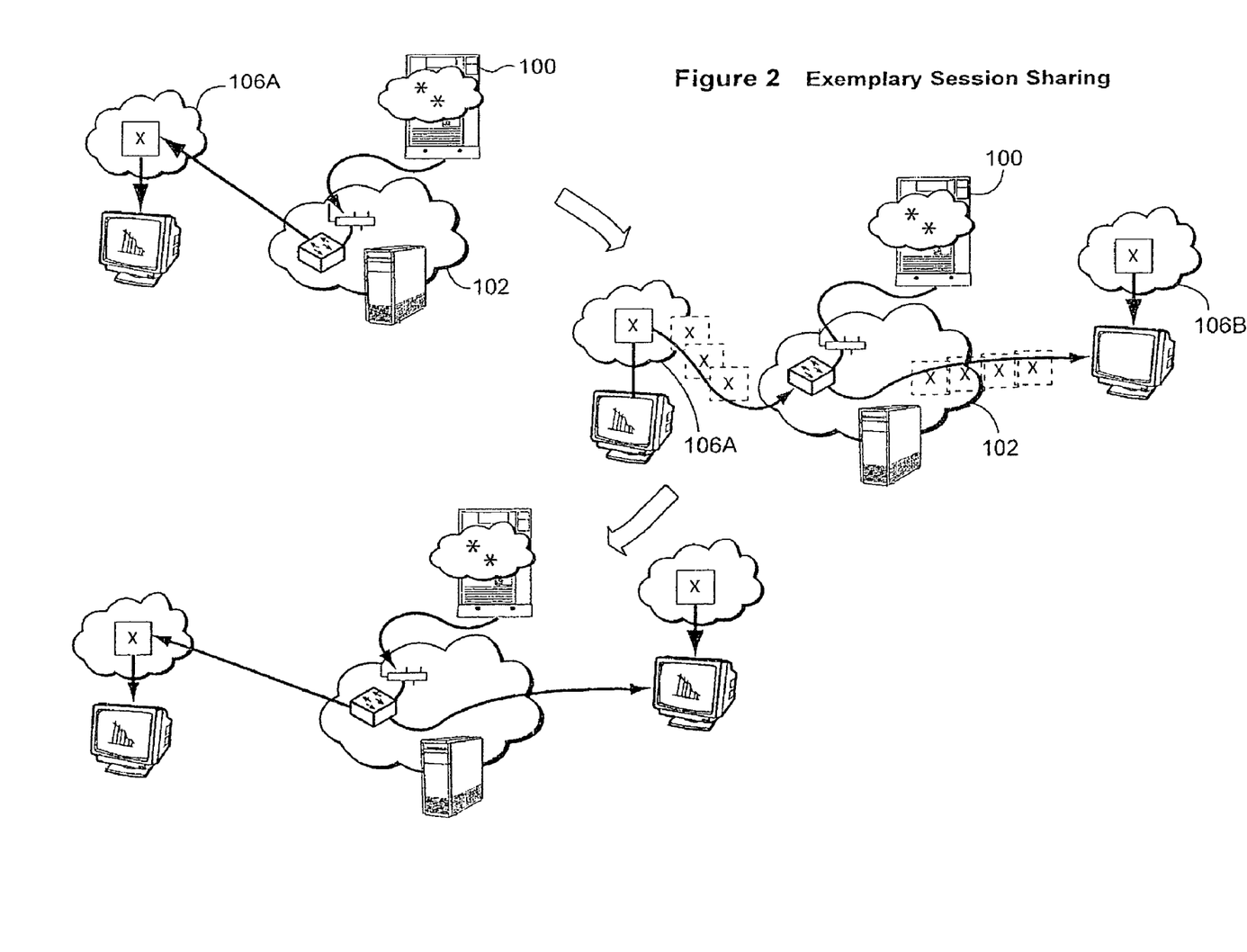
FIG. 2 is an exemplary non-limiting illustration of session migration/session sharing.

Referring to FIG. 2, the upper left diagram illustrates the normal operation of an X client application 100 connected to a protocol router 102, which in turn routes protocol to an X display on user A's workstation 106A. (The location of the protocol router 102 on a separate machine is immaterial in this scenario.)

When user B wants to share user A's session (middle right diagram), user B establishes a connection to the protocol router 102. After proper authentication, the protocol router 102 suspends communication with the X client 100, and creates a new X server display 106B on the user's workstation by cloning the X display on user A's workstation 106A and transmitting it to user B's workstation.

Normal operation is then resumed. Protocol now flows from the X client to two X displays.

Exemplary Non-Limiting Illustration of Suspend/Resume

Figure 3:
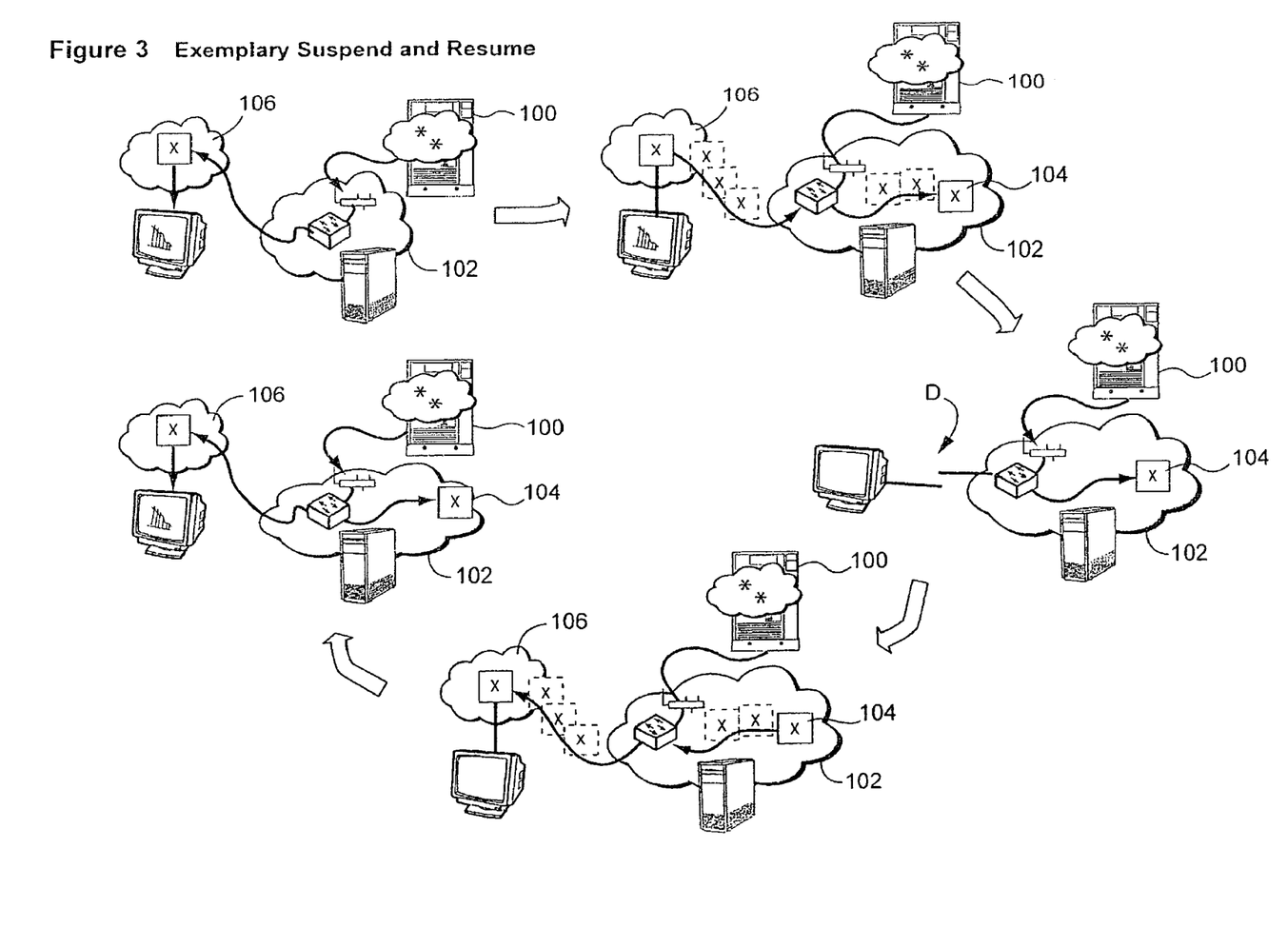
FIG. 3 is an exemplary non-limiting illustration of session migration/session suspend.

Referring to FIG. 3, the upper left diagram illustrates the normal operation of an X client application connected to a protocol router 102, which in turn routes protocol to an X display on the user's workstation 106. (The location of the protocol router on a separate machine from the user's workstation is used in this exemplary scenario.)

When the user wishes to suspend his session (upper right diagram), the protocol router 102 suspends communication with the X client, and creates a new headless X server display 104 by cloning the X display on the user's workstation 106 and transmitting it to a separate machine, such as for example the one on which the protocol router is running.

The connection between the protocol router 102 and the user's workstation 106 is then broken at D (middle right diagram) and normal communication with the X client is resumed.

To resume his session (perhaps on a different workstation), the user connects his same or different workstation 106 to the protocol router 102 (bottom diagram) which suspends communication with the X client 100, and creates a new X server display on the user's workstation 106 by cloning the headless X display 104 and transmitting it to the user's workstation.

In the left diagram, normal communication with the X client 100 is resumed. The user has resumed his session. The continued existence of the headless X server 104 as illustrated in the diagram is optional. By discarding it after cloning and transmitting it to the user's workstation, the original state represented by the upper left diagram is again reached.

More Detailed Exemplary Illustrative Non-Limiting Architecture Description

Figure 4:
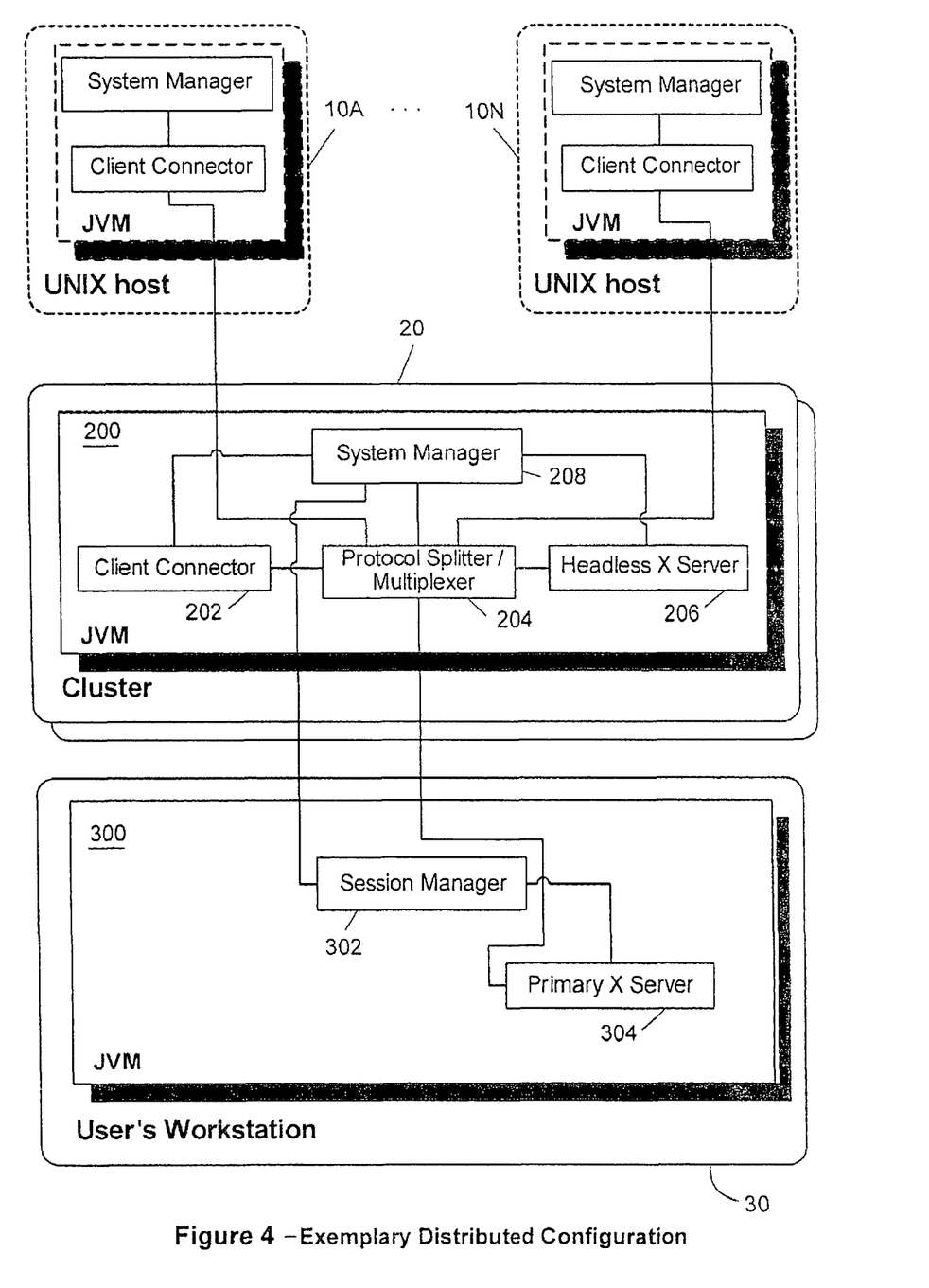
FIG. 4 is an exemplary illustrative non-limiting distributed architecture.

FIG. 4 shows an exemplary illustrative non-limiting distributed X server architecture including a plurality of UNIX hosts 10A, 10N; a cluster 20 and a user's workstation 30. The X server displays the graphical output of one or more X clients running on one or more user's workstation 30. This display is termed an X session. The exemplary illustrative non-limiting implementation allows the display to be suspended on one machine and resumed on another, or shared with other users.

As originally architected, an X server is a monolithic application to which X clients directly connect via TCP/IP or other network transport, and which displays its output on a dedicated graphics terminal. The exemplary illustrative non-limiting implementation permits the display to be dynamically rerouted to a different graphics terminal, or to several graphics terminals, without disrupting X clients.

The exemplary illustrative non-limiting implementation uses a revised architecture of an X server shown in FIG. 4 which permits X sessions to be suspended and resumed, as well as shared with users on other displays. In this new architecture, an X server is broken into two major session components.

1) A static component known as the protocol router 204, which accepts client connections and routes protocol between the clients and X server display(s).

2) A dynamic component known as an X server display 206, 304, which processes protocol and maintains a display.

In one exemplary illustrative non-limiting implementation, there is only one protocol router 204 per X session, but there can be any number of X server displays 206, 304. Of course, one can have as many different simultaneous X sessions as desired.

The exemplary illustrative non-limiting implementation makes the X server display serializable, so that it can be cloned, converted to network form, and transferred to another machine.

A special form of the X server display is the "headless X display 206" which maintains its display entirely in memory. A "headless" X display 206 serves to keep the session alive when no other X server display is connected. The presence of a headless X display 206 also provides fault tolerance in the event that other X server displays are lost.

When initially created, the first X server display 206, 304 will be in a pristine state equivalent to that of an X server with no clients connected. When cloned (i.e., when serialized, transmitted, and deserialized), a newly created X server display will have identical data structures, context and state to that of the original X server display (whether headless or not). Therefore, the cloned X server display will be prepared to handle the same protocol sent to the original display, and its display output will be identical to that of the original X server display.

During serialization, the protocol router will temporarily interrupt processing of X protocol, and wait until all X server displays quiesce before proceeding with serialization. After new X server displays have been added or old ones eliminated, the protocol router will restart protocol processing. This ensures that all X server displays remain in identical states at all times.

Figure 5:
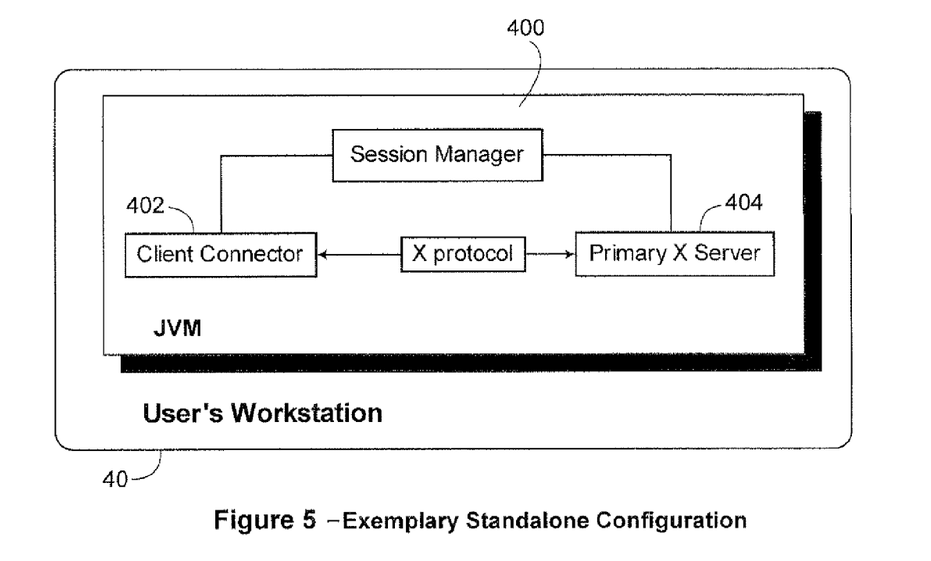
FIG. 5 shows an exemplary illustrative non-limiting stand-alone architecture.

In an exemplary illustrative non-limiting standalone environment shown in FIG. 5, an X server is run in the traditional manner; clients connect directly to that X server, and display on that machine. All necessary components run inside a single process 400 on the user's workstation 40. Such a process may be for example a Java process running within a Java Virtual Machine (JVM), making the process platform-independent and easily serializable.

In the exemplary illustrative non-limiting distributed environment shown in FIG. 4, the monolithic X server's client connector 202 is separated from the rest of the X server 206, 304 and runs as an independent component. Multiple X servers 206, 304 may be connected to the same session, allowing multiple users to view the same session (although one will be the primary X server, supporting keyboard and mouse activity; the other, secondary X servers will simply mirror the primary X server's display). A special form of an X server 206 with no display (termed a "headless" X server) may also be connected; it maintains display contents in memory, and serves to keep a session alive even though no displaying X servers may be connected.

EXAMPLE

Suspending a Session (Without Session Fault Tolerance)

"Suspending a session" means to terminate the user's X server display on his workstation, while retaining connections to X clients and continuing to process their requests. In order for this to succeed, the protocol router can be located in a process other than the user's X server display. Typically, this is a process on another machine, that is, not on the user's workstation. Such an exemplary illustrative non-limiting architecture is shown in FIG. 4.

When the user suspends the session, the X server display 304 running on his workstation will be serialized, sent to the machine where the protocol router 204 resides, and deserialized, where it becomes a headless X server 206 display that may be dynamically created on demand. This new headless X server 206 display is then connected to the protocol router 204. This allows the session to continue processing X client protocol. The user's X server display 304 is detached from the protocol router 204 and simply discarded. The net effect of this operation is that the user's X server display 304 is transferred to the protocol router's process 204 where it becomes a headless X server display 206—and the session endpoint has thus migrated from the user's workstation to the server. The X server session which has dynamically migrated from an X server display 304 interacting in real time with a human user via a physical display and input devices, to a virtual X server display 206 can be maintained in an active state by machine intelligence without any need for human user interactivity.

When the user resumes the session, the headless X server display 206 is serialized, sent to his workstation 30, and deserialized (thereby creating primary X server 304). The headless X server display 206 may then, if desired, be detached from the protocol router and discarded. The net effect of this operation is that the headless X server display 206 is transferred to the user's workstation 30 (and the session is migrated from the virtual X server to a user-interactive X server including a display and input device) where it becomes visible again.

Example

Suspending a Session with Session Fault Tolerance

When a session must survive involuntary disconnection of all X server displays, a protocol router is started on a machine deemed to be immune or at least resistant to hardware or network failure. A headless X server display 206 is also created on the protocol router's machine, and is never discarded regardless of whether any other X server displays are connected to the protocol router.

If the user wishes to suspend the session, the X server 304 display running on his workstation 30 is detached from the protocol router 204 and simply discarded. There is no need to serialize it and transfer it to the protocol router 204, since a headless X server 206 is already present there.

If the user wishes to resume the session, the headless X server display 206 is serialized and sent to his workstation 30.

However, in this case, the headless X server 206 remains connected to the protocol router 204 and is not discarded.

If the user's workstation crashes or otherwise becomes disconnected or unavailable, his X server display 304 is lost and therefore detached from the protocol router 204. The headless X server 206 permits the session to continue responding to X client protocol, and can subsequently be used to recreate the user's X server display.

Example

Sharing a Session

"Sharing a session" means to allow two or more X server displays to be connected to the protocol router 204. These displays may be placed on other workstations, allowing other users to observe and possibly control the session. See FIG. 4 for example.

When another user wishes to share a session, an existing X server display (either the headless X server 206 display, if present, or another user's display 304) is serialized, sent to his machine, and connected to the protocol router 204. That user now sees the session displayed on his machine. When the user wishes to leave the session, his X server display is detached from the protocol router and discarded. As many such displays as desired may be created and destroyed dynamically on a demand basis. Any desired communications point-to-point, multicast or broadcast communications protocol may be used to encapsulate the X protocol for distribution to multiple user-interactive X server 304 displays.

Exemplary Illustrative Non-Limiting Components

The exemplary illustrative non-limiting architecture provides several interrelated components running in a potentially distributed environment, including the following:

- Client connector(s) 202, to which X clients make a permanent connection, lasting across session suspend/resume activity. Client connectors 202 may be instantiated in several locations: in a traditional standalone session, one client connector 202 would run on the user's workstation and interact directly with the X server; in a distributed session, one or more client connectors 202 could run on X clients' hosts or on a machine in the cluster. A client connector 202 generates X protocol requests and handles X protocol replies, events and errors.
- Protocol splitter and multiplexer 204, one per session, responsible for routing X protocol between client connectors 202 and servers 206, 304.
- Headless X server 206, which connects to the protocol splitter 204; intended to maintain session state and service X client requests while the primary X server 306 is disconnected.
- Primary X server 304, which connects to the protocol splitter 204; displays screens associated with that session, and sends keyboard and mouse events to the protocol splitter 204 where they will be transmitted to all X servers associated with the session.
- Secondary X server (not shown), which connects to the protocol splitter 204, and mirrors the display of the primary X server 306.
- Session manager 302, which controls creation of initial X server session and lifespan of its related components (client connectors 202, protocol splitter and multiplexer 204), initiates client connections to that X server, and also handles subsequent suspending and resuming of the session.
- System manager 208, which controls creation and destruction of components in a given process.

Exemplary Illustrative Non-Limiting Component Architecture

Implementation of the ability to suspend and resume sessions could be done several different ways. For example, using an exemplary illustrative proxy server/viewer model, the X server code that actually draws the graphics to the display could be replaced with a proxy server to (a) maintain an in-memory copy of the display, and (b) forward changes to the display to a viewer. In such cases, removing a viewer and adding it again later does not affect the proxy server's operation at all. Adding a viewer may be done at any time, and only requires that the current display contents be sent from the proxy server to the viewer.

Alternatively, the "viewer" could be a complete X server with state that remains synchronized with the other (headless, display in memory) server, as shown in FIG. 4. The advantages of the latter exemplary illustrative non-limiting solution are:

- No new protocol has to be designed and tested; instead, the existing X protocol is sent not only to the headless server but to all viewers.
- In any case, the viewers need a lot of state information from the device independent layer of the X server: GC (graphics context), font, window, and many smaller objects are necessary to perform the drawing functions. It would be a large effort with little return to identify what objects need to be replicated for a viewer to function.
- Research has already been done on the topic of splitting (or replicating) the X protocol to multiple servers. This research not only will prove useful in achieving the goal of multiple viewers attached to the same server, but serves as a proof-of-concept that maintaining the viewer as a complete X server is viable.

Compared to a traditional X server, the session consisting of a core headless display/system manager combination as shown in FIG. 4 has these additional exemplary illustrative non-limiting characteristics:

- It is able to suspend operations long enough to replicate state so that viewers can be instantiated with identical state and begin handling X protocol in parallel with the headless server. This functionality is invoked by the system manager when a session manager informs it of an impending change.
- Multiple sessions can run in the same process space.
- The session can remain active even while no primary server is connected, by drawing entirely in memory. These contents are subsequently replicated to reconnecting X servers.
- Mouse and keystroke events can be fed to or accepted from an external source.

In the exemplary illustrative non-limiting implementation, the system manager 208 is responsible for several functions:

- Upon request from the session manager 302, handles creation of a session; instantiates a protocol splitter 204 and a headless server 206 with desired configuration (including screen characteristics).
- The protocol splitter 204 manages the X protocol between client connectors 202 and servers 206, 304. Protocol from clients is sent to the headless server 206 and all currently attached primary or secondary servers (e.g., 304). Mouse and keystroke events from the primary X server 306 are merged by the protocol splitter 204 with X protocol and passed to the headless X server 206 (and all other secondary X servers) so that all state remains synchronized. X protocol from the headless X server 206 is passed back to the client.

Handles disconnection of an X server. This amounts to removing the server from the protocol splitter's list of protocol recipients. If the session is being terminated, the protocol splitter 204, headless X server 206 and all other attached X servers should be discarded.

Handles reconnection of an X server. The reconnection may be authenticated. Screen and other configuration data must also be compatible between headless and primary X servers. The system manager 208 causes the protocol splitter 204 to suspend protocol to the headless server 206, to serialize its state, to send the serialized object to the session manager 302 which creates a new X server 304 with state identical to the headless server 206, to add the new X server to the list of protocol recipients, and finally to resume protocol with the headless server and all primary and secondary X servers.

In the exemplary illustrative non-limiting implementation, a primary X server 304 is essentially identical to a headless server 206 except that its display is visible, and it forwards mouse and key events to the headless server (via the protocol splitter). The X server 304 receives its protocol from the protocol splitter 204, as a headless server does.

The session manager 302 controls the lifecycle of, and connections to, the X server. It provides several functions:

It permits the user to configure the screen characteristics and other server settings before creation of the session.

It creates the initial primary X server (304).

It instantiates X servers that are reconnecting to the protocol splitter (in cooperation with the system manager).

It destroys X servers when the user suspends or terminates a session.

The protocol splitter and multiplexer 204 is responsible for ensuring that all X servers (headless, primary or secondary) connected to it remain in identical states.

When sessions do not need to be suspended, and session fault tolerance is not desired or needed, a protocol router and a single X server display may be collocated in the same process as shown in FIG. 5. Configured this way, the arrangement of session components appears identical to the traditional monolithic X server. Unlike the traditional X server, however, additional X server displays can be added to the session. This enables the session to be shared with other users. When no X server display is connected to the session, the session terminates and shuts down X clients.

While the technology herein has been described in connection with exemplary illustrative non-limiting implementations, the invention is not to be limited by the disclosure. The invention is intended to be defined by the claims and to cover all corresponding and equivalent arrangements whether or not specifically disclosed herein.

I claim:

1. A process for migrating an X session from a first computing device to a further computing device coupled via a computer network that communicates data signals therebetween, comprising:

(a) providing, on a first computing device having physical hardware including a display and at least one processor, an X session comprising a protocol router, an X server display connected to at least one X client, the X server display being architected to not depend on the first computing device's physical hardware but to instead maintain a device-independent view of such hardware and provide a presentation layer that maps the device-independent view to the underlying hardware and vice versa, thereby hiding device-independent characteristics from the X client;

serializing the X server display on the first computing device to cause a cloned copy of the X server display to be created, with identical state and contents of the first-mentioned X server display, and which causes the cloned copy of the X server display to respond with protocol indistinguishable from that of the first-mentioned X server display;

(b) transferring the serialized X server display from said first workstation computing device to a further computing device different from the first computing device; and (c) deserializing said serialized X server display on said further computing device to process X protocol on said further computing device, thereby causing the X session to appear on said further computing device.

2. The process of claim 1 wherein said X session on said first computing device comprises a headless X session display.

3. The process of claim 1 wherein said first computing device comprises a user workstation, and said X session on said first computing device comprises a user-interactive X session display.

4. The process of claim 1 wherein said X server display on said further computing device is transferred to said first computing device in response to detection that said X server display is the last X server display connected to the session being suspended.

5. The process of claim 1 further including disconnecting said X server display on said first computing device from the protocol router and connecting said X server display on said further computing device to said protocol router.

6. The process of claim 1 further including allowing said X server display on said first computing device to suspend and resume by redirecting said session thereto upon resumption.

7. The process of claim 1 further including migrating X server displays between computing devices.

8. A system including:

a first computing device;

a further computing device;

a computer network that communicates data signals between the first computing device and the further computing device;

an X server comprising a protocol router and an X server display;

at least one X client connected to the protocol router, the protocol router being configured to route identical X protocol from the at least one X client to the X server display;

the X server display being architected to not depend on computing device physical hardware but instead maintaining a device-independent view of such hardware and providing a presentation layer that maps the device-independent view to the underlying hardware and vice versa, and which hides device-dependent characteristics from X clients;

the X server display being further architected to not depend on other device-dependent data but instead obtaining state from a central repository defined for each X session;

the X server display component being serialized and deserialized to cause an identical or "cloned" copy of the X server display to be created, with identical state and contents of the original X server display, and which causes the new X server display to respond with protocol indistinguishable from that of the original X server display;

said first computing device serializing an X server display and transferring the serialized X server display over the computer network to the further computing device;

the further computing device deserializing said serialized X server display to process X protocol on said further computing device, thereby causing the X session to appear on said further computing device.

* * * * *